US012679015B2

(12) United States Patent
Naito et al.

(10) Patent No.: US 12,679,015 B2
(45) Date of Patent: Jul. 14, 2026

(54) INJECTION MOLDING MACHINE FOR FOAM MOLDING AND METHOD FOR CONTROLLING INJECTION MOLDING MACHINE

(71) Applicant: THE JAPAN STEEL WORKS, LTD., Tokyo (JP)

(72) Inventors: Akihiro Naito, Tokyo (JP); Takuya Yufu, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 199 days.

(21) Appl. No.: 18/265,356

(22) PCT Filed: Nov. 17, 2021

(86) PCT No.: PCT/JP2021/042337
§ 371 (c)(1),
(2) Date: Jun. 5, 2023

(87) PCT Pub. No.: WO2022/124033
PCT Pub. Date: Jun. 16, 2022

(65) Prior Publication Data
US 2024/0042664 A1      Feb. 8, 2024

(30) Foreign Application Priority Data

Dec. 10, 2020    (JP) ................................. 2020-204670

(51) Int. Cl.
*B29C 45/77* (2006.01)
*B29C 45/28* (2006.01)
(Continued)

(52) U.S. Cl.
CPC .............. *B29C 45/77* (2013.01); *B29C 45/28* (2013.01); *B29C 45/74* (2013.01);
(Continued)

(58) Field of Classification Search
CPC ...................... B29C 2945/76943; B29C 45/77
(Continued)

(56) References Cited

U.S. PATENT DOCUMENTS 6,435,853 B1      8/2002 Teraoka et al.
2003/0011090 A1*   1/2003 Yamaki ................... B29C 45/60
261/DIG. 26
(Continued)

FOREIGN PATENT DOCUMENTS

CN      101402245 A    4/2009
CN      102320115 A    1/2012
(Continued)

OTHER PUBLICATIONS

Mayama, T., English machine-translation by Clarivate Analytics of JP-2004155134-A with full JP patent application included., B29C45/48, Jun. 3, 2004. (Year: 2004).*
(Continued)

*Primary Examiner* — Abbas Rashid
*Assistant Examiner* — Gregory C. Grosso
(74) *Attorney, Agent, or Firm* — Sughrue Mion, PLLC

(57) ABSTRACT

An injection molding machine includes a heating cylinder having a gas inlet, a screw, a gas cylinder, a pressure reducing valve configured to reduce a primary pressure of a gas from the gas cylinder to a secondary pressure, a gas supply portion configured to supply the gas at the secondary pressure to the gas inlet, an injection material pressure detection device configured to detect an injection material pressure in a vicinity of the gas inlet, and a controller. The controller is configured to detect an abnormality by comparing the injection material pressure with the secondary pressure.

18 Claims, 6 Drawing Sheets

(51) Int. Cl.
  *B29C 45/74* (2006.01)
  *B29C 45/76* (2006.01)
(52) U.S. Cl.
  CPC .................... *B29C 45/7613* (2013.01); *B29C 2945/76006* (2013.01); *B29C 2945/7618* (2013.01); *B29C 2945/76498* (2013.01)
(58) Field of Classification Search
  USPC ......................................... 264/40.7; 700/200
  See application file for complete search history.

(56) References Cited

U.S. PATENT DOCUMENTS

| | | | | |
|---|---|---|---|---|
| 2006/0197247 | A1* | 9/2006 | Speight ................... | B29C 45/77 |
| | | | | 425/145 |
| 2009/0087510 | A1 | 4/2009 | Hakoda et al. | |
| 2018/0361635 | A1* | 12/2018 | Montague, II .......... | B29C 45/76 |
| 2020/0122365 | A1* | 4/2020 | Yusa ..................... | B29B 7/7414 |
| 2020/0180200 | A1 | 6/2020 | Chen et al. | |
| 2024/0051208 | A1 | 2/2024 | Naito et al. | |

FOREIGN PATENT DOCUMENTS

| | | | |
|---|---|---|---|
| CN | 103707479 | A | 4/2014 |
| CN | 116568476 | A | 8/2023 |
| JP | 59-71836 | A | 4/1984 |
| JP | 61-182912 | A | 8/1986 |
| JP | 63-166513 | A | 7/1988 |
| JP | 2000-176958 | A | 6/2000 |
| JP | 2001-113556 | A | 4/2001 |
| JP | 2003-251672 | A | 9/2003 |
| JP | 2004-155134 | A | 6/2004 |
| JP | 2014-69415 | A | 4/2014 |
| JP | 2014-200937 | A | 10/2014 |
| JP | 2015-44315 | A | 3/2015 |
| JP | 6429942 | B1 | 11/2018 |
| JP | 7463261 | B2 | 4/2024 |
| TW | 202021772 | A | 6/2020 |

OTHER PUBLICATIONS

Mayama, T., English machine-translation by Clarivate Analytics of JP-2004155134-A with full JP patent application included., B29C45/48, Jun. 3, 2004. (See NPL Document Filed on May 15, 2025). (Year: 2004).*

Tamada, K., et al., "English machine-translation by Clarivate Analytics of JP-2018199306-A with full JP patent application included ", B29C45/00, May 29, 2017. (See NPL Document Filed on Oct. 1, 2025.) (Year: 2017).*

International Search Report (PCT/ISA/210) issued by the International Searching Authority on Jan. 11, 2022 in corresponding International Application No. PCT/JP2021/042337.

Written Opinion (PCT/ISA/237) issued by the International Searching Authority on Jan. 11, 2022 in corresponding International Application No. PCT/JP2021/042337.

Communication dated May 9, 2025, issued by the Taiwan Intellectual Property Office in Taiwanese Application No. 110146204.

Office Action issued on Jun. 27, 2025 by the Chinese Patent Office in corresponding CN Patent Application No. 202180082688.0.

* cited by examiner

INJECTION MOLDING MACHINE FOR FOAM MOLDING AND METHOD FOR CONTROLLING INJECTION MOLDING MACHINE

CROSS REFERENCE TO RELATED APPLICATIONS

This application is a National Stage of International Application No. PCT/JP2021/042337 filed on Nov. 17, 2021 claiming priority from Japanese Patent Application No. 2020-204670 filed on Dec. 10, 2020, the disclosures of which are incorporated herein in their entirety by reference.

TECHNICAL FIELD

The present invention relates to an injection molding machine for molding a foam molded product by injecting an inert gas into an injection material, and a method for controlling such an injection molding machine.

BACKGROUND ART

An injection molding machine for obtaining a foam molded product by using a physical foaming agent, that is, an inert gas is substantially implemented as follows. That is, an injection molding machine for foam molding includes a heating cylinder and a screw. An inside of the heating cylinder is divided into a plurality of sections according to a shape of the screw, and includes, from upstream to downstream, a first compression and metering section, a starvation section, and a second compression and metering section. The heating cylinder is provided with an inert gas injection portion so as to correspond to the starvation section. An inert gas is supplied from a gas supply source such as a gas cylinder. A primary pressure of the gas supplied from the gas supply source is reduced to a secondary pressure by a pressure reducing valve. The inert gas at the secondary pressure is supplied to the injection portion.

An injection material is fed from upstream to downstream in the heating cylinder by the screw, is melted, and is kneaded in the first compression and metering section. Then, in the starvation section, a pressure of the injection material decreases, and the inert gas at the secondary pressure is injected. The injection material into which the inert gas is injected is kneaded, compressed, and metered in the second compression and metering section, and is injected into a mold to obtain a foam molded product.

CITATION LIST

Patent Literature

PTL 1: JP2014-200937A

In the injection molding machine for foam molding, a so-called vent-up may occur in which the injection material is pushed up in the inert gas injection portion and blocks the injection portion. An injection molding machine for foam molding described in PTL 1 is provided with a vent-up detection mechanism on an injection portion performs mechanical detection when a vent-up occurs, and pushes an injection material back into a heating cylinder.

SUMMARY OF INVENTION

Technical Problem

In the Injection molding machine for foam molding, various problems other than the vent-up may occur. For example, there may be a backflow of the inert gas or a defective supply of the inert gas caused by a supply abnormality of the injection material. The secondary pressure of the inert gas is appropriately controlled by the pressure reducing valve, and the secondary pressure is confirmed to be a desired pressure by a pressure gauge that allows visual confirmation. The injection material is controlled to be appropriately supplied to the heating cylinder. However, such problems may not be completely prevented, and there may be a problem that even if a problem occurs, the problem is not noticed, so that a large number of defective products may be produced.

Other problems and novel features will become apparent from the description of the present specification and the accompanying drawings.

Solution to Problem

The present disclosure relates to an injection molding machine having a following configuration. That is, the injection molding machine includes a heating cylinder provided with a Las inlet, a screw, a gas supply device, an injection material pressure sensor provided in a vicinity of the gas inlet of the heating cylinder, and control means. The gas supply device includes a gas supply source and pressure adjustment means that is configured to adjust a primary pressure of a gas from the gas supply source to a secondary pressure. The gas supply device is configured to supply the gas at the secondary pressure from the gas inlet. The control means is configured to detect an abnormality by comparing an injection material pressure detected by injection material pressure detection means with the secondary pressure.

Advantageous Effects of Invention

According to the present disclosure, it is possible to quickly catch a sign of occurrence of a vent-up, a supply abnormality of an injection material, and the like, and to prevent occurrence of a defective product.

BRIEF DESCRIPTION OF DRAWINGS

FIG. 6 is a diagram showing the method for controlling the injection molding machine according to the present embodiment, which is performed according to an injection material pressure.

DESCRIPTION OF EMBODIMENTS

Figure 1:
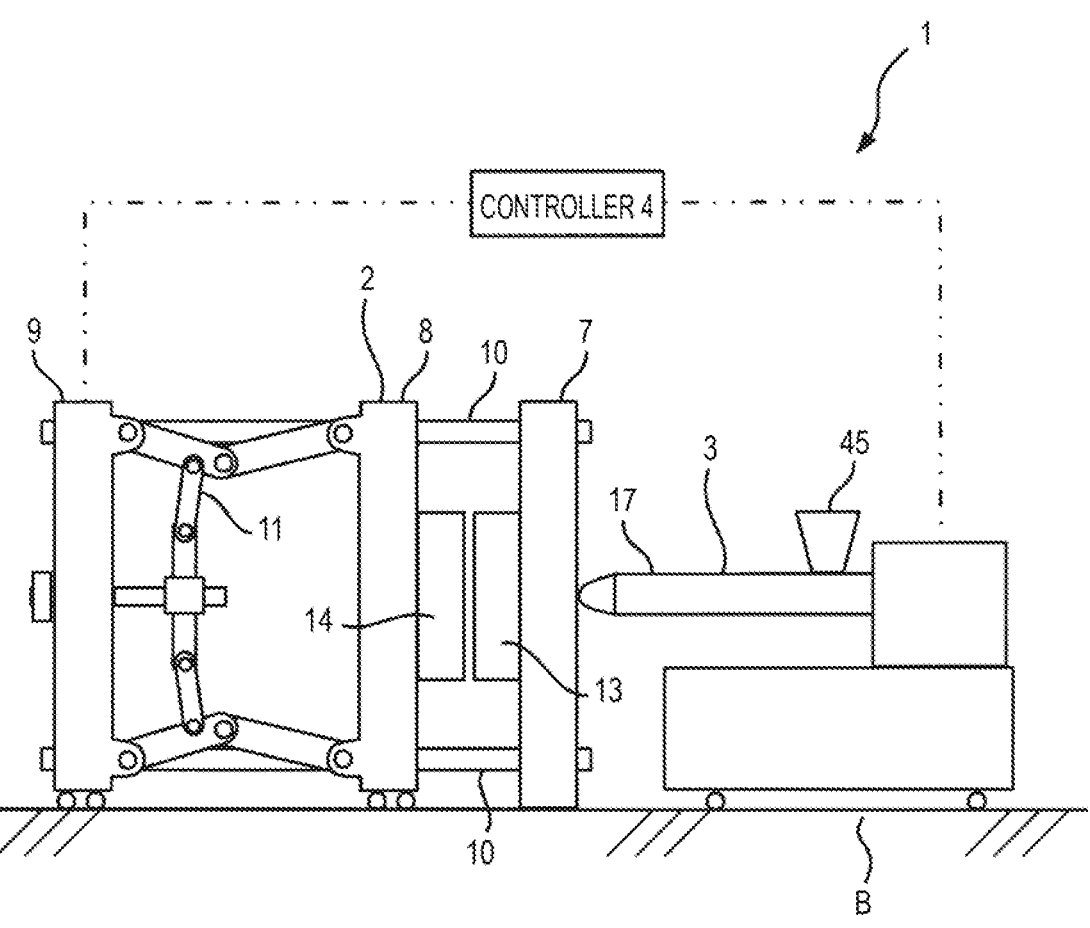
FIG. 1 is a front view showing an injection molding machine according to the present embodiment.

Hereinafter, a specific embodiment will be described in detail with reference to the drawings. However, the present invention is not limited to the following embodiment. In order to clarify the description, the following description and the drawings are simplified as appropriate. In the drawings, the same elements are denoted b the same reference numerals, and repeated description thereof is omitted as necessary: in addition, hatching may be omitted to avoid complicating the drawings.

The present embodiment will be described.

<Injection Molding Machine>

As shown in FIG. 1, an injection molding machine 1 according to the present embodiment generally includes a mold clamping device 2 provided on a bed B, and an injection device 3, The injection molding machine 1 is controlled by a controller 4 as control means. The mold clamping device 2 may be of a direct pressure type, but is of a toggle type in the present embodiment. That is, the mold clamping device 2 includes a fixed platen 7, a movable platen 8, a mold clamping housing 9, tie bars 10, 10, . . . connecting the mold clamping housing 9 and the fixed platen 7, and a toggle mechanism 11. In the mold clamping device 2, the fixed platen 7 and the movable platen 8 are provided with molds 13 and 14, respectively. When the toggle mechanism 1I is driven, the molds 13 and 14 are mold clamped.

<Injection Device>

Figure 2:
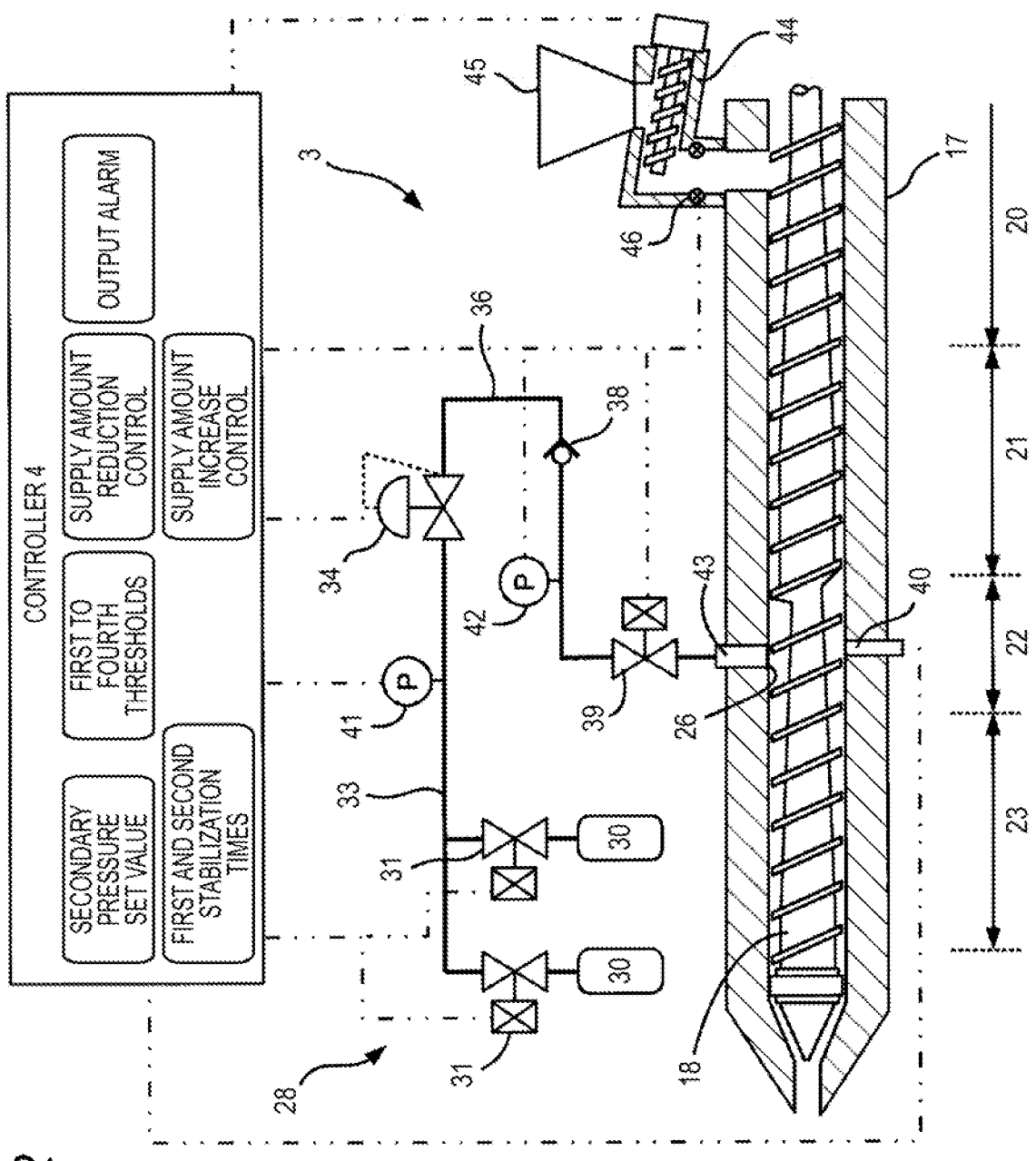
FIG. 2 is a front sectional view showing an injection device according to the present embodiment.

The injection device 3 according to the present embodiment is an injection device for foam molding using a physical foaming agent, that is, a gas. The injection device 3 is shown in FIG. 2. The injection device 3 includes a heating cylinder 17 and a screw 18 inserted in the heating cylinder 17. The screw 18 has a flight groove depth that changes from upstream toward downstream, and an inside of the heating cylinder 17 is divided into a plurality of sections. That is, from upstream, the inside of the heating cylinder 17 is divided into a supply section 20 in which an injection material is supplied and melted, a first compression and metering section 21 in which the molten injection material is compressed, a starvation section 22 in which a pressure of the injection material decreases, and a second compression and metering section 23, The heating cylinder 17 is provided with a gas inlet 26 in the starvation section 22, and a gas is injected into the injection material. The injection material and the gas are kneaded in the second compression and metering section 23.

<Gas Supply Device>

A gas supply device 28 according to the present embodiment is connected to the gas inlet 26, The gas supply device 28 includes two gas cylinders 30 and 30 as gas supply sources, gas cylinder on-off valves 31 and 31, a primary gas pipe 33 to which a gas from the gas cylinders 30 and 30 is supplied via the gas cylinder on-off valves 31 and 31, a pressure reducing valve 34 as pressure adjustment means configured to adjust a gas pressure in the primary gas pipe 33, that is, a primary pressure to a secondary pressure, a secondary gas pipe 36 to which the gas at a pressure reduced to the secondary pressure by the pressure reducing valve 34 is supplied, a check valve 38 provided in the secondary gas pipe 36, and an on-off valve 39 as on-off means also provided in the secondary gas pipe 36. The primary gas pipe 33 is provided with a primary pressure gauge 41 as primary pressure detection means which is configured to detect the primary pressure. The secondary gas pipe 36 is provided with a secondary pressure gauge 42 as secondary pressure detection means which is configured to detect the secondary pressure. A tip end of the secondary gas pipe 36 is a gas supply portion 43 and is connected to the gas inlet 26.

Among these devices configuring the gas supply device 28, the primary pressure gauge 41 and the secondary pressure gauge 42 are connected to the controller 4, and the primary pressure and the secondary pressure are input to the controller 4. The gas cylinder on-off valves 31 and 31, the pressure reducing valve 34, and the on-off valve 39 are connected to the controller 4. The gas cylinder on-off valves 31 and 31, the pressure reducing valve 34, and the on-off valve 39 are controlled by the controller 4.

The gas supply device 28 according to the present embodiment is implemented as described above. However, the present invention can be implemented with one gas cylinder 30 or with three or more gas cylinders 30 as a gas supply source, instead of this configuration, the gas supply device 28 may be implemented by, for example, the gas cylinders 30 and 30 and a booster, or a nitrogen generator and a booster. The on-off valve 39 may be provided in a middle of a gas pipe that supplies a gas at a secondary pressure to a gas inlet, or an on-off mechanism such as a needle valve that is operated by compressed air or the like ma y be provided in a gas injection portion. In the present embodiment, the gas cylinder on-off valves 31 and 31 serve as a gas supply source switching means that selectively switches which of the gas cylinders 30 and 30 that are the gas supply sources is to be used. By opening or closing the gas cylinder on-off valves 31 and 31, the gas cylinders 30 and 30 to be used can be switched.

Generally, nitrogen, carbon dioxide, or the like, which is an inert gas, is used as the gas to be supplied, but any type of gas, such as air, hydrocarbon gas, argon, helium, or hydrogen, may be used as long as the gas dissolves in a resin.

In the present embodiment, the gas cylinder on-off valve 31, the primary pressure gauge 41, the check valve 38, and the on-off valve 39 are provided, but are not essential. However, when these devices are provided, various measures can be taken when an abnormality occurs. In addition, in the present embodiment, most of the devices configuring the gas supply device 28 are connected to the controller 4, but do not necessarily have to be connected to the controller 4. That is, it is not essential that the secondary pressure gauge 42 is connected to the controller 4. However, when the secondary pressure gauge 42 is connected to the controller 4, a measurement value of the secondary pressure, that is, a secondary pressure measurement value can be obtained. In this way, it is possible to determine whether an abnormality occurs by comparing an injection material pressure to be described below with the secondary pressure measurement value.

<Injection Material Pressure Detection Means>

The injection molding: machine 1 according to the present embodiment has a feature that injection material pressure detection means, that is, an injection material pressure sensor 40 is provided in a vicinity of the gas inlet 26 of the heating cylinder 17. The injection material pressure sensor 40 is also connected to the controller 4, and the injection material pressure in the vicinity of the gas inlet 26, that is, in the starvation section 22 is measured and input to the controller 4. The controller 4 determines a normality or an abnormality by comparing the injection material pressure with the secondary pressure.

In the injection molding machine 1 according to the present embodiment, an amount of the gas dissolved in the injection material is controlled by a pressure of the gas supplied into the heating cylinder 17. The screw 18 disposed in the starvation section 22 has a deep flight groove depth and a large volume of a groove between flights. Thus, in a state where no gas is supplied, a pressure sensed by the injection material pressure sensor 40 is substantially zero. On the other hand, in a state where the gas is supplied, the pressure sensed by the injection material pressure sensor 40 is substantially equal to the pressure, that is, the secondary pressure of the supplied gas, <Feeder>

A feeder 44 is attached to the heating cylinder 17 of the injection device 3 according to the present embodiment. The feeder 44 is also connected to and controlled by the controller 4, and an amount of the injection material supplied from a hopper 45 to the heating cylinder 17 is controlled. The feeder 44 is provided with an injection material detection sensor 46. The sensor 46 is also connected to the controller 4. Based on a signal from the injection material detection sensor 46, the controller 4 is configured to determine whether the injection material is appropriately supplied from the feeder 44. Incidentally, the injection material detection sensor 46 may be attached to the feeder 44, or may be attached to an injection material supply port of the heating cylinder 17 or the hopper 45. The injection material detection sensor 46 may be provided on a material conveying device or the like for automatically supplying the injection material to the feeder 44 or the hopper 45. When the injection material detection sensor 46 is provided on the hopper 45 or the material conveying device or the like, it is sufficient to detect whether the injection material to be supplied to the feeder 44 remains.

In the injection molding machine 1 according to the present embodiment, an amount of the gas dissolved in the injection material is controlled by a pressure of the gas supplied into the heating cylinder 17. The screw 18 disposed in the starvation section 22 has the deep flight groove depth and the large volume of the groove between the flights, and thus a pressure of a resin flowing from the upstream first compression and metering section 21 is reduced, and the injection material pressure is substantially zero. Therefore, even a gas at a relatively low pressure that can be supplied from a gas cylinder or the like can be stably supplied. The starvation section 22 of the heating cylinder 17 is filled with the gas supplied into the heating cylinder 17. Since the gas acts in an isotropic manner as a fluid pressure, the injection material pressure in the starvation section 22 is approximately equal to the secondary pressure. The gas comes into contact with the molten resin in the starvation section 22 and dissolves in an amount corresponding to the gas pressure. That is, the amount of the gas dissolved in the molten resin increases in proportion to the secondary pressure.

On the other hand, when the amount of the resin in the starvation section 22 increases and the injection material pressure increases for some reason, a vent-up may occur in which the resin enters the gas inlet 26, and the gas may not be supplied into the heating cylinder 17. Therefore, by detecting an increase in the injection material pressure, it is possible to detect a defective gas supply due to the vent-tip.

When the primary pressure of the gas supplied from the gas supply source is not sufficiently high relative to the secondary pressure, due to a decrease in the secondary pressure and a reduction in the amount of the gas supplied into the heating cylinder 17, the pressure of the gas in the starvation section 22 within the heating cylinder 17 decreases, and the amount of the gas dissolved in the molten resin is reduced. At this time, by detecting a decrease in the injection material pressure in the starvation section 22 or a decrease in the primary pressure, it is possible to detect a defect due to an insufficient gas supply from the gas supply source.

On the other hand, in the present embodiment, the feeder 44 is used to reduce a supply amount of a resin material. Normally, the gas supplied into the heating cylinder 17 is liquid-tightly sealed by the molten resin between the starvation section 22 and the first compression and metering section 21. However, when an amount of the resin supplied from the feeder 44 is too small, or when the material runs out even if the feeder 44 is not used, the seal may be broken temporarily or continuously, and the gas may flow back to a primary side. At this time, the injection material pressure indirectly decreases due to a leakage of the gas in the starvation section 22, and thus it is possible to detect the backflow of the gas by detecting the injection material pressure.

When such a vent-up, a gas pressure decrease, a gas backflow, or the like occurs, a molding defect may frequently occur. Thus, in the injection molding machine 1 according to the present embodiment, it is important to manage the secondary pressure and detect abnormalities.

<Controller>

In the injection molding machine 1 according to the present embodiment, as will be described in detail below, the controller 4 is configured to detect various abnormalities by comparing the injection material pressure and the secondary pressure of the gas. In addition, when an abnormality is detected, the controller 4 is configured to take various measures according to a content of the abnormality. Various set values and programs are provided in the controller 4 in order to detect an abnormality and take measures against the abnormality. The set values include a secondary pressure set value that is a set value of the secondary pressure, and first to fourth thresholds and first and second stabilization times which are set values for determining an abnormality of the injection material pressure. The programs include programs for performing outputting alarm, supply amount increase control, and supply amount reduction control, and these programs are stored in the controller 4.

<Method for Controlling Injection Molding Machine According to Present Embodiment>

Hereinafter, a method for controlling the injection molding machine according to the present embodiment will be described. In the method for controlling the injection molding machine according to the present embodiment, the injection material pressure detected by the injection material pressure sensor 40 is input to the controller 4, and the controller 4 determines a normality or an abnormality by comparing the injection material pressure with the secondary pressure of the gas, and takes necessary measures.

The secondary pressure to be compared with the injection material pressure may be the secondary pressure set value set in advance in the controller 4, or may be the secondary pressure measurement value detected by the secondary pressure gauge 42. This is because the secondary pressure set value and the secondary pressure measurement value are to be substantially equal. The secondary pressure of the gas may be feedback-controlled by the controller 4 so as to reach the secondary pressure set value. When the secondary pressure gauge 42 is not connected to the controller 4, the secondary pressure to be compared with the injection material pressure is naturally the secondary pressure set value. When the secondary pressure to be compared with the injection material pressure is set as the secondary pressure set value, the secondary pressure gauge 42 is not essential in the configuration of the injection device 3 shown in FIG. 2.

Figure 6:
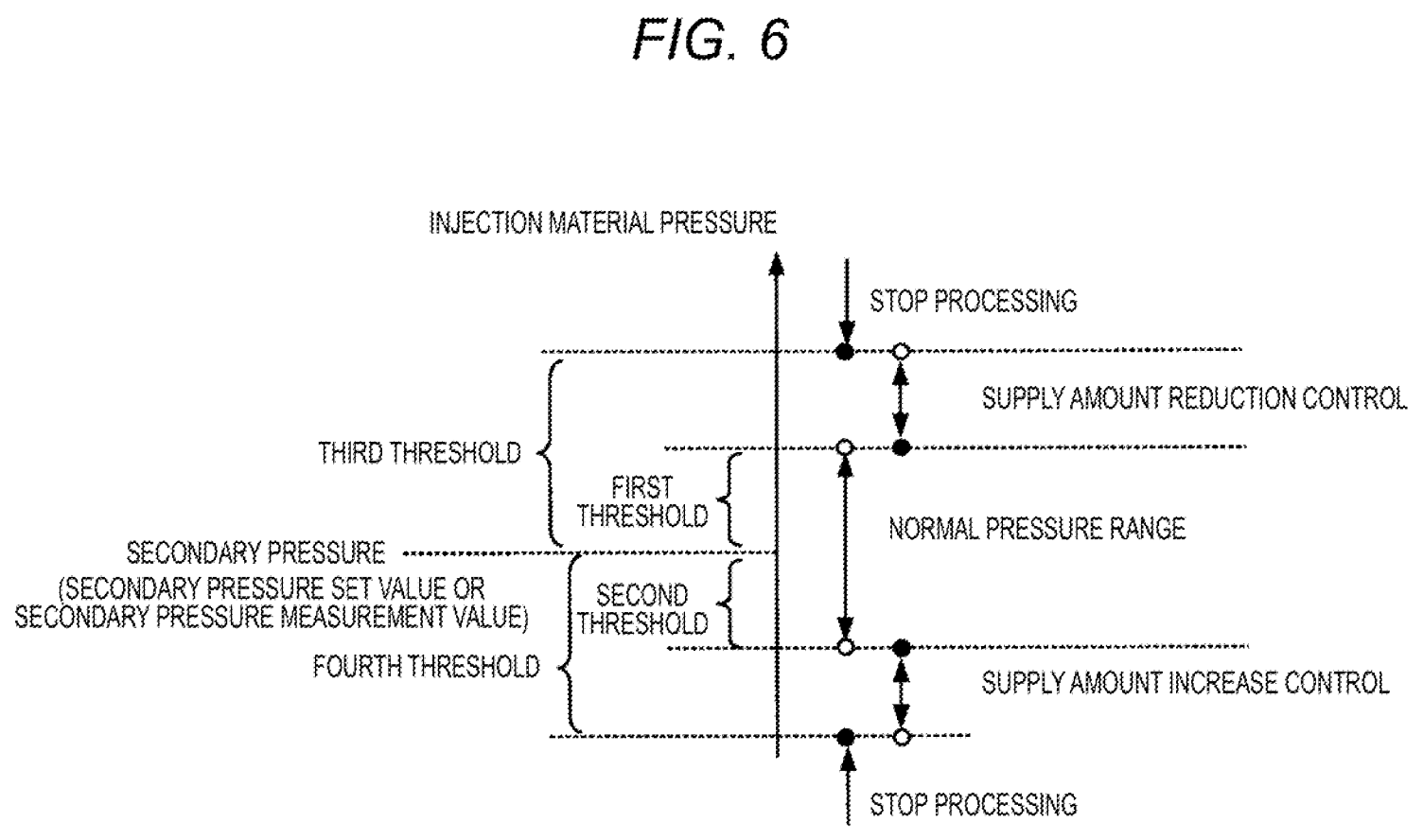

The controller 4 determines the normality or the abnormality by comparing the injection material pressure with the secondary pressure, and uses the first to fourth thresholds as a criterion for the determination or a criterion for determining measures to be taken. FIG. 6 collectively shows a range of the normality or the abnormality determined by the secondary pressure and the first to fourth thresholds and measures to be taken according to each state when the injection material pressure changes. Hereinafter, processing executed by the controller 4 will be described with reference thereto, <Processing Executed by Controller>

Figure 3A:
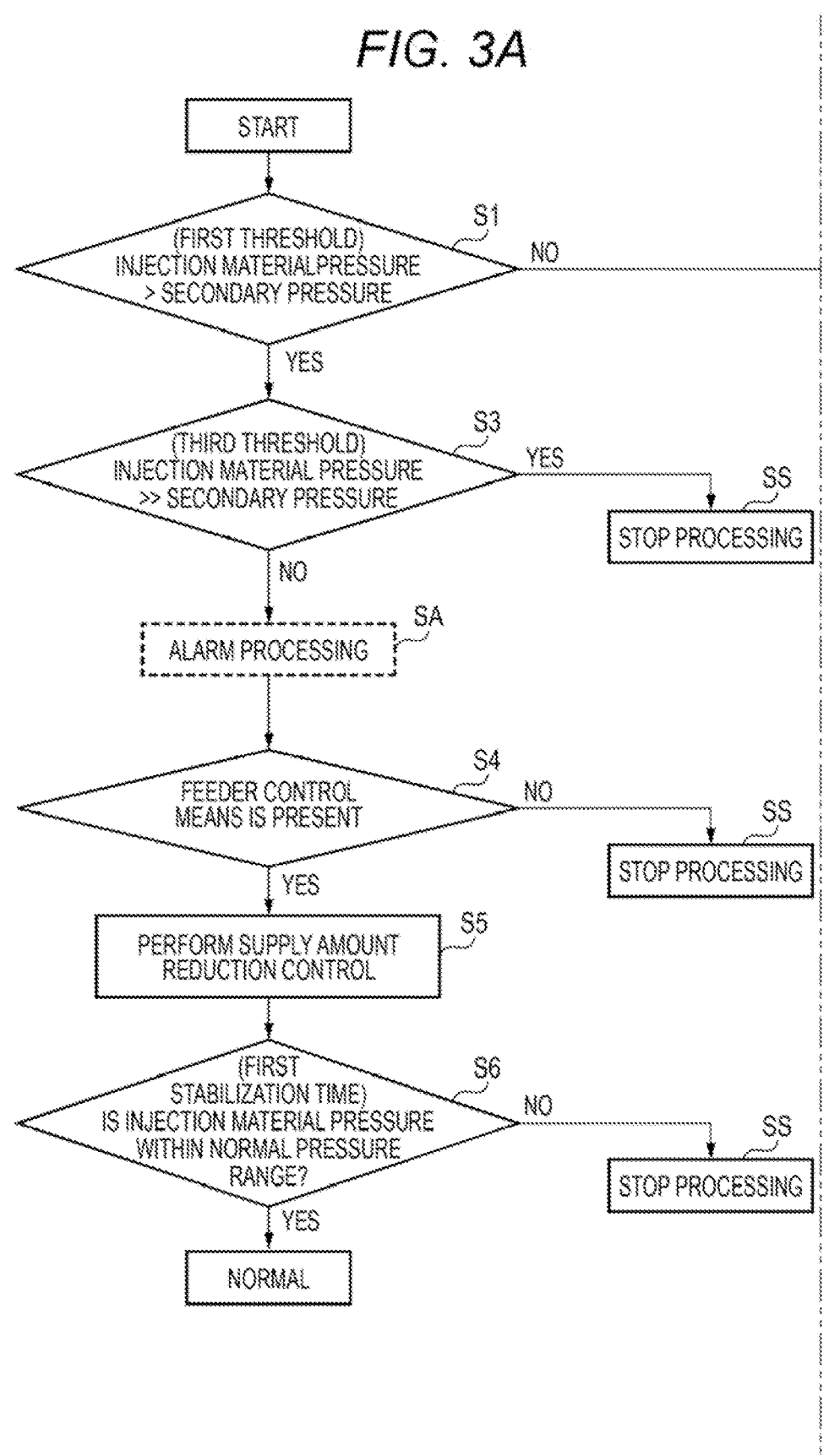
FIGS. 3A and 3B are flow charts showing a control method performed in the injection molding machine according to the present embodiment.
Figure 3B:
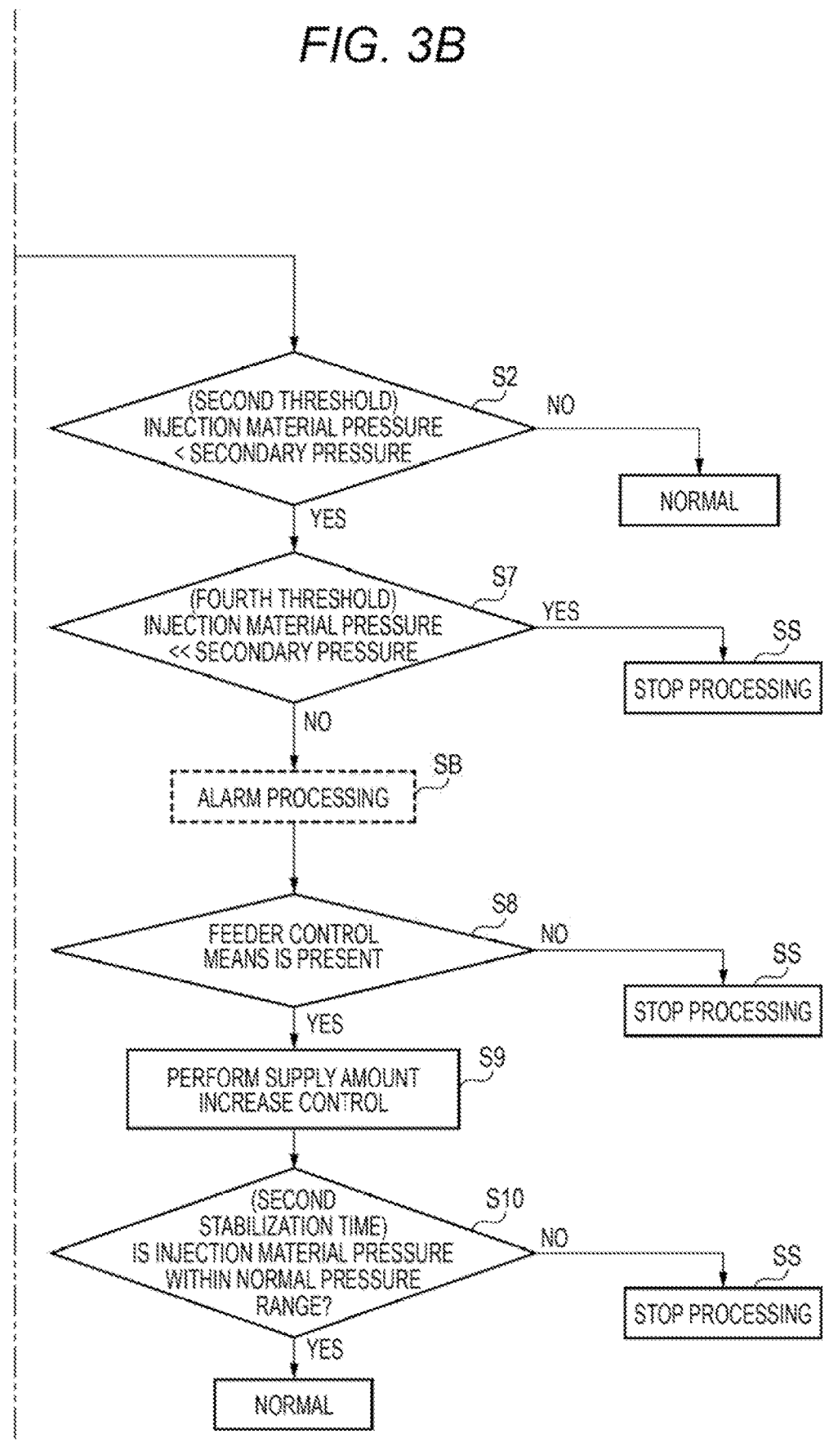

As shown in FIGS. 3A and 3B, the controller 4 proceeds from the start to step S1 to determine whether the injection material pressure is greater than a value that is obtained by adding the first threshold to the secondary pressure. When the injection material pressure is less than the value that is obtained by adding the first threshold to the secondary pressure, the controller 4 proceeds to step S2. In step S2, the controller 4 determines whether the injection material pressure is less than a value that is obtained by subtracting the second threshold from the secondary pressure. When the injection material pressure is greater than the value that is obtained by subtracting the second threshold from the secondary pressure, the controller 4 determines that the injection material pressure is normal. That is, with the secondary pressure as a criterion, a normal pressure range of the injection material pressure is defined as a range greater than the lower second threshold and less than the upper first threshold. When the injection material pressure is within the normal pressure range, the controller 4 determines that the injection material pressure is normal and returns to the start.

When it is determined in step S1 that the injection material pressure is greater than the secondary pressure and a difference between the injection material pressure and the secondary pressure is equal to or greater than the first threshold, the controller 4 proceeds to step S3. In step S3, the controller 4 checks whether the injection material pressure is greater than the secondary pressure and whether the difference between the injection material pressure and the secondary pressure is less than the third threshold. When the difference is equal to or greater than the third threshold, there is a high possibility that a vent-up occurs. At this time, the controller 4 executes stop processing SS.

Figure 5:
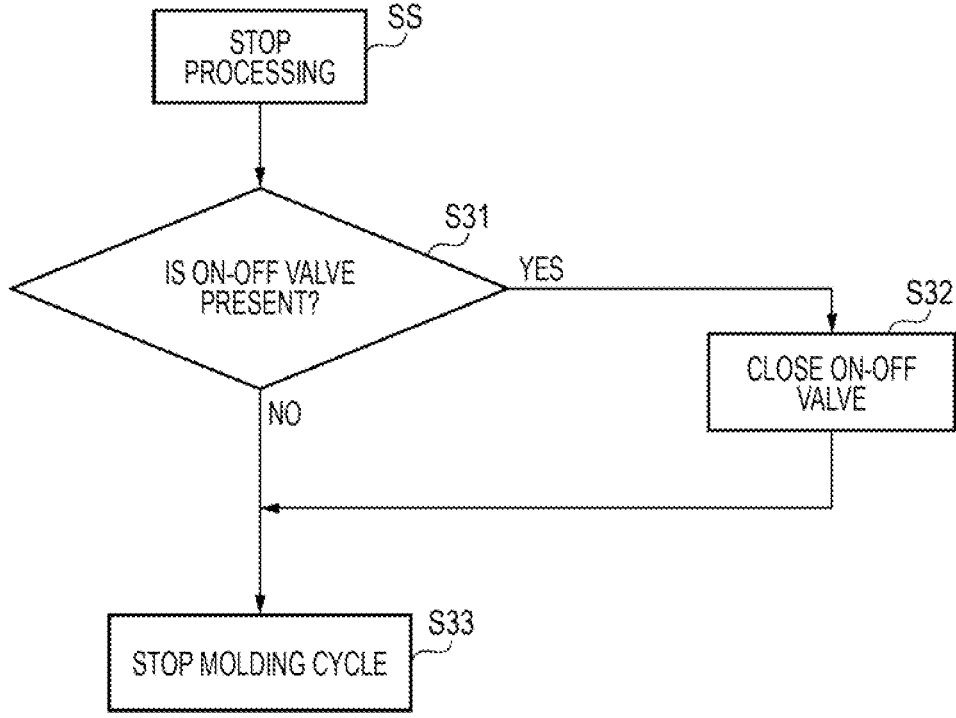
FIG. 5 is a flow chart showing the control method performed in the injection molding machine according to the present embodiment.

In the stop processing SS, as shown in FIG. 5, the controller 4 confirms in step S31 whether the on-off means, that is, the on-off valve 39 can be controlled. When the on-off valve 39 is present, the controller 4 executes step S32 to close the on-off valve 39 and stop the gas supply. Next, regardless of the presence or absence of the on-off valve 39, the controller 4 executes step S33, waits for completion of a molding cycle currently being executed, and stops the molding cycle. The stop processing SS may be executed immediately or after a delay of a certain period of time or a certain cycle, depending on a cause, urgency classification of manned and unmanned operations, and the like. The controller 4 may execute alarm processing SB to be described later simultaneously with or prior to the stop processing SS in order to inform an operator of an abnormality.

When it is determined that the difference between the injection material pressure and the secondary pressure is less than the third threshold in step S3 of the flow chart in FIG. 33A, the controller 4 executes alarm processing SA. In the alarm processing SA, the controller 4 outputs an alarm indicating that there is a risk of a vent-up at the gas inlet 26. The alarm may be displayed as a message on a monitor attached to the controller 4, or may be output as an alarm sound from a speaker. Alternatively, the controller 4 may notify an administrator of the alarm by means of e-mail or the like.

When the alarm processing SA is executed, the controller 4 proceeds to step S4. In step S4, the controller 4 checks whether the feeder 44 is present and whether the feeder 44 is operable, that is, whether feeder control means is present.

When no feeder control means is present, the controller 4 executes the stop processing SS. That is, the controller 4 operates and closes the on-off valve 39, stops the gas supply, waits for the completion of the molding cycle currently being executed, and then stops the molding cycle. When the feeder control means is present, the controller 4 proceeds to step S5.

In step S5, the controller 4 performs the supply amount reduction control. The supply amount reduction control is control for reducing an amount of the injection material supplied to the heating cylinder 17 by decreasing a driving speed of the feeder 44. By reducing the supply amount, the injection material pressure in the starvation section 22 is decreased. In this way, the injection material pressure is within the normal pressure range.

When the supply amount reduction control is performed, the controller 4 observes a progress in step S6. That is, the controller 4 monitors the injection material pressure to check whether the injection material pressure returns to the normal pressure range within the first stabilization time. When the injection material pressure returns to the normal pressure range within the first stabilization time, the controller 4 determines that the injection material pressure is normal. That is, the controller 4 returns the processing to the start. However, when the injection material pressure does not return to the normal pressure range within the first stabilization time, the controller 4 executes the stop processing SS already described.

Regarding step S2, only the processing when the injection material pressure is determined to be within the normal pressure range has been described. A case where the injection material pressure is out of the normal pressure range will be described. When it is detected in step S2 that the injection material pressure is equal to or less than the value that is obtained by subtracting the second threshold from the secondary pressure, the controller 4 determines that the injection material pressure falls below the normal pressure range, and proceeds to step S7.

In step S7, the controller 4 checks whether the injection material pressure is greater than a value that is obtained by subtracting the fourth threshold from the secondary pressure. When the injection material pressure is equal to or less than the value that is obtained by subtracting the fourth threshold from the secondary pressure, the stop processing SS already described is executed. When the injection material pressure is greater than the value that is obtained by subtracting the fourth threshold from the secondary pressure, the controller 4 executes the alarm processing SB. In the alarm processing SB, the controller 4 outputs an alarm indicating that there is a risk of a gas leakage or a decrease in a gas cylinder pressure due to a decrease in the injection material pressure. The alarm may be displayed as a message on a monitor attached to the controller 4, or may be output as an alarm sound from a speaker. Alternatively, the controller 4 may notify an administrator of the alarm by means of e-mail or the like.

When the alarm processing SB is executed, the controller 4 proceeds to step S8. In step SS, the controller 4 checks whether the feeder 44 is present and whether the feeder 44 is operable, that is, whether a feeder control means is present. When no feeder control means is present, the controller 4 executes the stop processing SS already described. When the feeder control means is present, the controller 4 proceeds to step S9.

In step S9, the controller 4 performs the supply amount increase control. The supply amount increase control is control for increasing the amount of the injection material supplied to the heating cylinder 17 by increasing the driving speed of the feeder 44. By increasing the supply amount of the injection material, the injection material pressure in the starvation section 22 is increased. In this way, the injection material pressure is within the normal pressure range.

When the supply amount increase control is performed, the controller 4 observes a progress in step S10. That is, the controller 4 monitors the injection material pressure to check whether the injection material pressure returns to the normal pressure range within the second stabilization time. When the injection material pressure returns to the normal pressure range within the second stabilization time, the controller 4 determines that the injection material pressure is normal. That is, the controller 4 returns the processing to the start. However, when the injection material pressure does not return to the normal pressure range within the second stabilization time and the injection material pressure is equal to or less than the value that is obtained by subtracting the second threshold from the secondary pressure, the controller 4 executes the stop processing SS already described.

Figure 4:
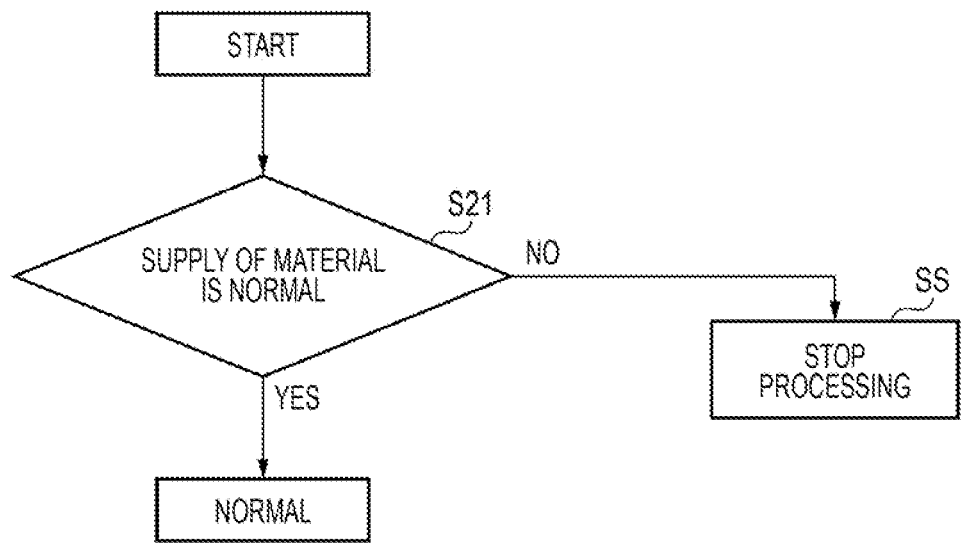
FIG. 4 is a flow chart showing the control method performed in the injection molding machine according to the present embodiment.

In the injection molding machine 1 according to the present embodiment, it is also checked whether the supply of the injection material is normal. That is, the controller 4 executes step S21 as shown in FIG. 4. The controller 4 checks whether the injection material falls into the heating cylinder 17 at a predetermined interval by using the injection material detection sensor 46 which is injection material detection means. When the supply of the injection material is not normal, the controller 4 executes the stop processing SS already described.

The above is the method for controlling the injection molding machine according to the present embodiment, and it has been described that the first and second thresholds and the like are used for the secondary pressure to determine the normality or the abnormality of the injection material pressure or the like. It is desirable that the first and second thresholds are set in a range of 0.1 MPa to 1.5 MPa. and more preferably a range of 02 MPa to 1.0 MPa. The third and fourth thresholds may be set to numerical values slightly greater than the first and second thresholds, respectively.

For the first and second thresholds and the like, ratios may be used instead of using specific pressure values. For example, the normal range of the injection material pressure may be 95% to 110% of the secondary pressure, Determination using the ratios in this way is substantially the same as the determination using the first and second thresholds. That is, setting the first and second thresholds within the above numerical range is the same as setting the first threshold to 10% of the secondary pressure and the second threshold to 5% of the secondary pressure.

It is also possible to use upper and lower limits of the normal range. For example, when the secondary pressure is set to 10 MPa, the normal range may be from 10.5 MPa to 9.5 MPa. In this case, the same result can also be obtained as in a case of the determination using the first and second thresholds or the ratios.

The method for controlling the injection molding machine according to the present embodiment can be applied to a case of having a plurality of secondary pressure set values and performing control to change a pressure stepwise. In this case, the first and second thresholds and the like may be set so as to include maximum and minimum values of the plurality of secondary pressure set values, or set values corresponding to the first and second thresholds may be set for each secondary pressure set value.

As described above, in the present embodiment, the secondary pressure to be compared with the injection material pressure may use the secondary pressure set value set in the control means, or the measurement value of the secondary pressure detected by the secondary pressure gauge 42. This is because there is almost no difference between the secondary pressure set value and the measurement value of the secondary pressure when the starvation section 22 to which the gas is supplied is in a stable state.

In S7 in the present embodiment, the first, second, and fourth thresholds are used as a determination criterion for the alarm processing SB, that is, the alarm indicating the risk of the gas leakage or the decrease in the gas cylinder pressure. However, it is also possible to more directly use a difference between the secondary pressure and the primary pressure as the determination criterion for the risk of the decrease in the gas cylinder pressure. In this case, a fifth threshold may be used as the determination criterion for the difference between the primary pressure and the secondary pressure, and when the difference between the primary pressure and the secondary pressure is less than the fifth threshold, the alarm indicating the risk of the decrease in the gas cylinder pressure may be issued. The fifth threshold may be appropriately determined according to an amount of the gas used, and for example, 1 MPa may be used as one criterion. At this time, when the controller 4 has a gas supply source switching function, that is, a function to switch the gas cylinder 30 currently being used to another gas cylinder 30 by operating the gas cylinder on-off valves 31 and 31 in the present embodiment, gas supply source switching control may be performed to automatically switch the gas supply sources.

Although the invention made by the present inventor has been specifically described above based on the embodiment, it is needless to say that the present invention is not limited to the embodiment described above, and various modifications can be made without departing from the scope of the invention, hi addition, the measures may be changed between a case of the manned operation and a case of the unmanned operation. For example, in the case of the manned operation, a guideline for changing molding conditions may be displayed in a guidance manner instead of the supply amount increase control or the supply amount reduction control for the feeder 44, or in a case where the urgency is low; the processing may be stopped at the alarm processing to wait for measures of the operator, instead of executing the stop processing SS. A plurality of examples described above may be implemented in combination as appropriate.

Here, features of the embodiment of the injection molding machine for foam molding and the method for controlling the injection molding machine according to the present invention described above are briefly summarized in [1] to [17] below, respectively.

[1]

An injection molding machine (1) including;

a heating cylinder (17) having a gas inlet (26);

a screw (18) drivable in the heating cylinder (17);

a gas supply device (28) con figured to supply a gas to the gas inlet (26);

injection material pressure detection means (40) provided in a vicinity of the gas inlet (26) of the heating cylinder (17); and control means (4), in which the gas supply device (28) includes:

a gas supply source (30) configured to supply a gas; and pressure adjustment means (34) configured to adjust a primary pressure of a gas from the gas supply source (30) to a secondary pressure, in which the gas supply device is configured to supply the gas at the secondary pressure to the gas inlet (26), and in which the control means (4) is configured to detect an abnormality by comparing an injection material pressure detected by the injection material pressure detection means (40) with the secondary pressure.

[2]

The injection molding machine (1) according to [1], in which the control means (4) is configured to detect an abnormality of the injection material pressure based on the normal pressure range, the normal pressure range, which is a normal pressure range of the injection material pressure, being greater than a value that is obtained by subtracting a second threshold from the secondary pressure and being less than a value that is obtained by adding a first threshold to the secondary pressure.

[3]

The injection molding machine (1) according to [2], in which in a case where the injection material pressure is greater than the normal pressure range and the injection material pressure is less than a value that is obtained by adding a third threshold to the secondary pressure, the control means (4) issues an alarm indicating a risk of a vent-up at the gas inlet (26).

[4]

The injection molding machine (1) according to [2], in which a feeder (44) configured to adjust a supply amount of an injection material is attached to the heating cylinder (17), and in which in a case where the injection material pressure is greater than the normal pressure range and the injection material pressure is less than a value that is obtained by adding a third threshold to the secondary pressure, the control means (4) performs supply amount reduction control including reducing a supply amount of an injection material by controlling the feeder (44).

[5]

The injection molding machine (1) according to [4], in which in a case where the injection material pressure continuously exceeds the normal pressure range during a first stabilization time from a start of the supply amount reduction control, the control means (4) executes molding cycle stop processing.

[6]

The injection molding machine (1) according to [2], in which in a case where the injection material pressure is equal to or greater than a value that is obtained by adding a third threshold to the secondary pressure, the control means (4) executes molding cycle stop processing.

[7]

The injection molding machine (1) according to [2], in which in a case where the injection material pressure is less than the normal pressure range and the injection material pressure is greater than a value that is obtained by subtracting a fourth threshold from the secondary pressure, the control means (4) issues an alarm indicating a risk of a gas leakage or a decrease in a pressure of a supply gas at the gas inlet (26).

[8]

The injection molding machine (1) according to [2], (in which a feeder (44) configured to adjust a supply amount of an injection material is attached to the heating cylinder (17), and in which in a case where the injection material pressure is less than the normal pressure range and the injection material pressure is greater than a value that is obtained by subtracting a fourth threshold from the secondary pressure, the control means (4) performs supply amount increase control including increasing a supply amount of an injection material by controlling the feeder (44).

[9]

The injection molding machine (1) according to [8], in which in a case where the injection material pressure continuously temporarily falls below the normal pressure range during a second stabilization time from a start of the supply amount increase control, the control means (4) executes molding cycle stop processing.

[10]

The injection molding machine (1) according to [2], in which in a case where the injection material pressure is equal to or less than a value that is obtained by subtracting a fourth threshold from the secondary pressure, the control means (4) executes molding cycle stop processing.

[11]

The injection molding machine (1) according to any one of [1] to [10], in which the secondary pressure to be compared with the injection material pressure is a secondary pressure set value set in the control means (4).

[12]

The injection molding machine (1) according to any one of [1] to [10]

in which the gas supply device (28) includes secondary pressure detection means (42) configured to detect the secondary pressure, and in which the secondary pressure to be compared with the injection material pressure is a secondary pressure measurement value detected by the secondary pressure detection means (42).

[13]

The injection molding machine (1) according to any one of [1] to [12], further including:

injection material detection means (46) configured to confirm a supply of an injection material to the heating cylinder (17), in which in a case where the injection material is interrupted and an injection material shortage is detected, the control means (4) executes molding cycle stop processing.

[14]

The injection molding machine (1) according to any one of [5], [6], [9], [10], and [13], in which the molding cycle stop processing is processing of waiting for completion of a molding cycle being executed and stopping the molding cycle.

[15]

The injection molding machine (1) according to any one of [5], [6], [9], [10], and [13], in which the gas supply device (28) includes an on-off valve (31), and in which the molding cycle stop processing is processing of closing the on-off valve (31), waiting for completion of a molding cycle being executed, and stopping the molding cycle.

[16]

The injection molding machine (1) according to any one of [1] to [15], in which the gas supply device (28) includes primary pressure detection means (41) configured to detect a primary pressure of a gas from the gas supply source (30), and

in which the control means (4) is configured to:

detect a pressure decrease of the gas supply source (30) by comparing a difference between the primary pressure and the secondary pressure; and based on detecting the pressure decrease of the gas supply source (30), issue an alarm for prompting replacement of the gas supply source (30).

[17]

A method for controlling an injection molding machine, the injection molding machine including:

a heating cylinder (17) provided with a gas inlet (26);

a screw (18) drivable in the heating cylinder (17);

a gas supply device (28) configured to supply a gas to the gas inlet (26); and injection material pressure detection means (40) provided in a vicinity of the gas inlet (26) of the heating cylinder (17), the gas supply device (28) including:

a gas supply source (30); and pressure adjustment means (34) configured to adjust a primary pressure of a gas from the gas supply source (30) to a secondary pressure, the method including:

detecting an injection material pressure by the injection material pressure detection means (40): and detecting an abnormality by comparing the secondary pressure and the injection material pressure.

Although the present invention has been described in detail with reference to a specific embodiment, it will be apparent to those skilled in the art that various changes and modifications can be made without departing from the spirit and scope of the present invention.

The present application is based on Japanese Patent Application No. 2020-204670 filed on Dec. 10, 2020, and the contents thereof are incorporated herein as reference.

INDUSTRIAL APPLICABILITY

According to the present invention, it is possible to quickly catch a sign of occurrence of a vent-up, a supply abnormality of an injection material, and the like, and to prevent occurrence of a defective product. The present invention having this effect is useful in an injection molding machine for foam molding and a method for controlling the injection molding machine.

REFERENCE SIGNS LIST

1 Injection molding machine
2 Mold clamping device
3 Injection device
4 Controller
17 Heating cylinder
18 Screw
20 Supply section
21 First compression section
22 Starvation section
23 Second compression section
26 Gas inlet
28 Gas supply device
30 Gas cylinder
31 Gas cylinder on-off valve
33 Primary gas pipe
34 Pressure reducing valve
36 Secondary gas pipe
38 Check valve
39 On-off valve 40 Injection material pressure sensor
41 Primary pressure gauge
42 Secondary pressure gauge
44 Feeder
45 Hopper
46 Injection material detection sensor

The invention claimed is:

1. An injection molding machine comprising:

a heating cylinder having a gas inlet;

a screw drivable in the heating cylinder;

a gas supply configured to supply a gas to the gas inlet;

an injection material pressure detector provided in a vicinity of the gas inlet of the heating cylinder; and a controller, wherein an inside of the heating cylinder is divided into a plurality of sections according to a shape of the screw, and includes, from upstream to downstream, a first compression and metering section in which an injection material is melted and compressed, a starvation section in which a pressure of the molten injection material decreases, and a second compression and metering section, and wherein the injection material pressure detector are provided in the starvation section, wherein the gas supply includes:

a gas supply source configured to supply a gas; and a pressure adjustment regulator configured to reduce and adjust a primary pressure of a gas from the gas supply source to a secondary pressure, wherein the gas supply is configured to supply the gas at the secondary pressure to the gas inlet, and wherein the controller is configured to detect an abnormality based on whether an injection material pressure detected by the injection material pressure detector is within a normal pressure range, the normal pressure range greater than a value that is obtained by subtracting a second threshold from the secondary pressure and being less than a value that is obtained by adding a first threshold to the secondary pressure, the first threshold being larger than 0.1 MPa, and the second threshold being larger than 0.1 MPa.

2. The injection molding machine according to claim 1, wherein in a case where the injection material pressure is greater than the normal pressure range and the injection material pressure is less than a value that is obtained by adding a third threshold to the secondary pressure, the third threshold being larger than the first threshold, the controller issues an alarm indicating a risk of a vent-up at the gas inlet.

3. The injection molding machine according to claim 1, wherein a feeder configured to adjust a supply amount of an injection material is attached to the heating cylinder, and wherein in a case where the injection material pressure is greater than the normal pressure range and the injection material pressure is less than a value that is obtained by adding a third threshold to the secondary pressure, the controller performs supply amount reduction control including reducing a supply amount of an injection material by controlling the feeder.

4. The injection molding machine according to claim 3, wherein in a case where the injection material pressure continuously exceeds the normal pressure range during a first stabilization time from a start of the supply amount reduction control, the controller executes molding cycle stop processing.

5. The injection molding machine according to claim 1, wherein in a case where the injection material pressure is equal to or greater than a value that is obtained by adding a third threshold to the secondary pressure, the controller executes molding cycle stop processing.

6. The injection molding machine according to claim 1, wherein in a case where the injection material pressure is less than the normal pressure range and the injection material pressure is greater than a value that is obtained by subtracting a fourth threshold from the secondary pressure, the fourth threshold being larger than the second threshold, the controller issues an alarm indicating a risk of a gas leakage or a decrease in a pressure of a supply gas at the gas inlet.

7. The injection molding machine according to claim 1,
wherein a feeder configured to adjust a supply amount of an injection material is attached to the heating cylinder, and
wherein in a case where the injection material pressure is less than the normal pressure range and the injection material pressure is greater than a value that is obtained by subtracting a fourth threshold from the secondary pressure, the fourth threshold being larger than the second threshold, the controller performs supply amount increase control including increasing a supply amount of an injection material by controlling the feeder.

8. The injection molding machine according to claim 7, wherein in a case where the injection material pressure continuously temporarily falls below the normal pressure range during a second stabilization time that is a predetermined time from a start of the supply amount increase control, the controller executes molding cycle stop processing.

9. The injection molding machine according to claim 1, wherein in a case where the injection material pressure is equal to or less than a value that is obtained by subtracting a fourth threshold from the secondary pressure, the fourth threshold being larger than the second threshold, the controller executes molding cycle stop processing.

10. The injection molding machine according to claim 1, wherein the secondary pressure to be compared with the injection material pressure is a secondary pressure set value set in the controller.

11. The injection molding machine according to claim 1,
wherein the gas supply includes a secondary pressure detector configured to detect the secondary pressure, and
wherein the secondary pressure to be compared with the injection material pressure is a secondary pressure measurement value detected by the secondary pressure detector.

12. The injection molding machine according to claim 1,
wherein the gas supply includes a primary pressure detector configured to detect a primary pressure of a gas from the gas supply source, and
wherein the controller is configured to:
detect a pressure decrease of the gas supply source by comparing a difference between the primary pressure and the secondary pressure; and
based on detecting the pressure decrease of the gas supply source, issue an alarm for prompting replacement of the gas supply source.

13. The injection molding machine according to claim 1,
wherein the controller is further configured to:
detect an abnormality of the injection material pressure based on relationship between a normal pressure range and a predetermined condition, the normal pressure range being a normal pressure range of the injection material pressure; and based on detecting the abnormality of the injection material pressure, perform supply amount reduction control including reducing a supply amount of an injection material by controlling a feeder,
wherein the gas supply includes an on-off valve, and
wherein a molding cycle stop processing is processing of closing the on-off valve, waiting for completion of a molding cycle being executed, and stopping the molding cycle.

14. The injection molding machine according to claim 1,
wherein the controller is further configured to detect the abnormality in a case where the detected injection material pressure falls outside the normal pressure range, including when the detected injection material pressure is less than or equal to the value that is obtained by subtracting the second threshold from the secondary pressure, or when the detected injection material pressure is greater than or equal to the value that is obtained by adding the first threshold to the secondary pressure.

15. An injection molding machine comprising:
a heating cylinder having a gas inlet;
a screw drivable in the heating cylinder;
a gas supply configured to supply a gas to the gas inlet;
an injection material pressure detector provided in a vicinity of the gas inlet of the heating cylinder; and
a controller,
wherein the gas supply includes:
a gas supply source configured to supply a gas; and
a pressure adjustment regulator configured to adjust a primary pressure of a gas from the gas supply source to a secondary pressure,
wherein the gas supply is configured to supply the gas at the secondary pressure to the gas inlet, and
wherein the controller is configured to detect an abnormality by comparing an injection material pressure detected by the injection material pressure detector with the secondary pressure,
wherein the injection molding machine further comprises an injection material detector configured to confirm a supply of an injection material to the heating cylinder, and
wherein in a case where the injection material is interrupted and an injection material shortage is detected, the controller executes molding cycle stop processing.

16. The injection molding machine according to claim 15, wherein the molding cycle stop processing is processing of waiting for completion of a molding cycle being executed and stopping the molding cycle.

17. The injection molding machine according to claim 15,
wherein the gas supply includes an on-off valve, and
wherein the molding cycle stop processing is processing of closing the on-off valve, waiting for completion of a molding cycle being executed, and stopping the molding cycle.

18. An injection molding machine comprising:
a heating cylinder having a gas inlet;
a screw drivable in the heating cylinder;
a gas supply configured to supply a gas to the gas inlet;
an injection material pressure detector provided in a vicinity of the gas inlet of the heating cylinder; and
a controller,
wherein the gas supply includes:
a gas supply source configured to supply a gas; and
a pressure adjustment regulator configured to adjust a primary pressure of a gas from the gas supply source to a secondary pressure, wherein the gas supply is configured to supply the gas at the secondary pressure to the gas inlet, and
wherein the controller is configured to:
  detect an abnormality by comparing an injection material pressure detected by the injection material pressure detector with the secondary pressure;
  detect an abnormality of the injection material pressure based on relationship between a normal pressure range and a predetermined condition, the normal pressure range being a normal pressure range of the injection material pressure; and
  based on detecting the abnormality of the injection material pressure, perform supply amount reduction control including reducing a supply amount of an injection material by controlling a feeder, and
wherein a molding cycle stop processing is processing of waiting for completion of a molding cycle being executed and stopping the molding cycle.

* * * * *